United States Patent [19]
Herman et al.

[11] Patent Number: 5,215,553
[45] Date of Patent: Jun. 1, 1993

[54] APPARATUS FOR SEPARATING PARTICLES FROM A GASEOUS MEDIUM

[75] Inventors: Alvin Herman, Saskatoon; Rubien Herman, Outlook; Ken Bokor, Saskatoon, all of Canada

[73] Assignee: Blowhard Pneumatic Services Inc., Saskatoon, Canada

[21] Appl. No.: 941,394

[22] Filed: Sep. 8, 1992

[51] Int. Cl.⁵ .................................. B01D 45/12
[52] U.S. Cl. ................................. 55/1; 55/345; 55/399; 55/401; 55/456; 55/457
[58] Field of Search ................. 55/1, 52, 184, 185, 55/186, 187, 191, 192, 345, 395, 399, 401, 407, 408, 456, 457

[56] References Cited

U.S. PATENT DOCUMENTS

| | | |
|---|---|---|
| 2,221,385 | 11/1940 | Rogers . |
| 2,487,633 | 11/1949 | Breslove, Jr. . |
| 2,753,954 | 7/1956 | Tinker . |
| 3,426,513 | 2/1969 | Bauer . |
| 3,513,642 | 5/1970 | Cornett . |
| 3,577,711 | 5/1971 | De Bernardo ............ 55/456 X |
| 3,633,342 | 1/1972 | Richardson . |
| 3,813,854 | 6/1974 | Hortman . |
| 3,988,132 | 10/1976 | Oranje . |
| 4,179,273 | 12/1979 | Montusi . |
| 4,255,174 | 3/1981 | Simpson ................ 55/457 X |
| 4,569,687 | 2/1986 | Feng . |
| 4,853,011 | 8/1989 | Dyson . |
| 4,904,281 | 2/1990 | Raterman ................... 55/1 |
| 4,985,058 | 1/1991 | Prinsloo et al. . |

FOREIGN PATENT DOCUMENTS

| | | |
|---|---|---|
| 591522 | 1/1960 | Canada . |
| 865610 | 3/1971 | Canada . |
| 2043947 | 6/1991 | Canada . |

Primary Examiner—Charles Hart
Attorney, Agent, or Firm—Killworth, Gottman, Hagan & Schaeff

[57] ABSTRACT

This invention relates to an improved mechanical separator which is capable of continuous operation without clogging, which is capable of efficiently separating particulate material from a gaseous medium such as air in such a manner that the collected particulate material may be salvaged, and which apparatus is environmentally friendly in that it cleans gases such as air in a highly efficient manner while at the same time saving potentially valuable products which would otherwise be mainly lost.

18 Claims, 3 Drawing Sheets

APPARATUS FOR SEPARATING PARTICLES FROM A GASEOUS MEDIUM

BACKGROUND OF THE INVENTION

This invention relates to the separation of particles from a gaseous medium, particularly to the separation of various types of dust from air and the like thereby to effect cleaning of the gaseous medium or air and/or to provide for recovery of the particulate material or dust.

It is well known in the art to provide various forms of equipment for separating particles from a gaseous medium. Numerous forms of mechanical devices employing centrifugal separation of dust particles from air have been devised. Other industries use various forms of filter media including bags for effecting such separation. The use of filter media involves never ending problems as, for example, moisture in dust-laden air will quickly clog typical filter mediums. While most mechanical dust separators do not have the clogging problem inherent in the usual dust filters, problems have been encountered in the past in providing mechanical separation systems capable of providing a sufficiently high level of dust separation efficiency.

SUMMARY OF THE INVENTION

It is an object of the present invention to provide an improved mechanical separator which is capable of continuous operation without clogging, which is capable of efficiently separating particulate material from a gaseous medium such as air in such a manner that the collected particulate material may be salvaged, and which apparatus is environmentally friendly in that it cleans gases such as air in a highly efficient manner while at the same time saving potentially valuable products which would otherwise be mainly lost.

According to the invention in one aspect there is provided an apparatus for separating particles from a gaseous medium. The apparatus includes an inlet tube adapted to receive an axially moving flow of particle-laden gas. An axially arranged flow rotation device is disposed in said inlet tube to effect rotation of the gas around the axis of the inlet tube whereby particles are moved by centrifugal force radially outwardly to the wall of the inlet tube. A separation chamber is arranged concentrically with said inlet tube and downstream of said flow rotation device. The separation chamber defines an annular region bounded by an outer tubular wall and an inner extraction tube having a free upstream leading edge which splits the rotating flow into a rotating radially outer particle-rich stream and a radially inner particle-poor stream of gas. The particle-poor stream of gas moves axially within said extraction tube to an exit end thereof and the rotating particle-rich stream spirals along said annular region of said separation chamber between said outer tubular wall and said inner extraction tube. An elongated first deceleration chamber is connected to said separation chamber to receive therefrom the particle-rich stream of gas. The first deceleration chamber defines a generally upright or vertically oriented longitudinal central axis and has upper and lower outlets. The first deceleration chamber is shaped such that the particle-rich gas received therein spirals around the central axis thereof with a particle-poor fraction thereof spiralling upwardly toward and escaping through the upper outlet and a particle-rich fraction thereof spiralling downwardly under the influence of gravity and exiting via said lower outlet.

In accordance with a further aspect of the invention the first deceleration chamber receives the particle-rich stream of gas from the separation chamber via an entry port arranged closely adjacent the side wall of the first deceleration chamber to induce downward spiralling motion of the particle-rich fraction adjacent to and around the wall of the first deceleration chamber.

According to a still further aspect of the invention the upper outlet of the first deceleration chamber includes an axially arranged vortex finder through which the rotating particle-poor fraction of the gas escapes said chamber. The lower outlet comprises a tangentially arranged exit opening for continuously stripping or peeling off the particle-rich fraction of the gas which has spiralled to the lower end of the first deceleration chamber.

In a still further aspect of the invention there is provided a second deceleration chamber arranged to receive the particle-rich fraction of the gas via said lower outlet. The second deceleration chamber is a generally vertically oriented elongated chamber having a bottom end adapted to receive and collect particles and an upper end to receive and permit escape of particle-poor gases.

In accordance with a further aspect of the invention said second deceleration chamber is juxtaposed to the first deceleration chamber at said tangentially arranged exit opening so that the peeled-off particle-rich fraction of gas smoothly changes rotation direction on entering the second decelerating chamber and continues rotating and spiralling toward the lower particle collecting bottom end while a particle-poor fraction of the gas spirals toward the upper end of the chamber. The second decelerating chamber has an axially arranged vortex finder to provide escape of the spiralling gases.

According to a preferred embodiment of the invention both of said decelerating chambers include a conically shaped wall which increases in diameter toward the top.

A preferred embodiment of the invention includes conduit means transmitting the particle-poor gas flows from the upper outlets of the first and second deceleration chambers toward and into the particle-poor stream of gas travelling axially along said extraction tube.

Still further according to a preferred embodiment of the invention said extraction tube extends through said first deceleration chamber normal to said longitudinal central axis of said chamber, said extraction tube having an exit end on one side of the first deceleration chamber diametrically opposite the side thereof at which said separation chamber is located. The first deceleration chamber has a diameter measured normal to said central axis which is much greater than the diameter of said extraction tube at that location.

Still further according to the invention there are provided improved methods of separating particulate material from a gaseous medium substantially as described and claimed hereafter.

BRIEF DESCRIPTION OF VIEWS OF DRAWINGS

In drawings which illustrate a preferred embodiment of the invention:

DETAILED DESCRIPTION OF THE PREFERRED EMBODIMENT

Figure 1:
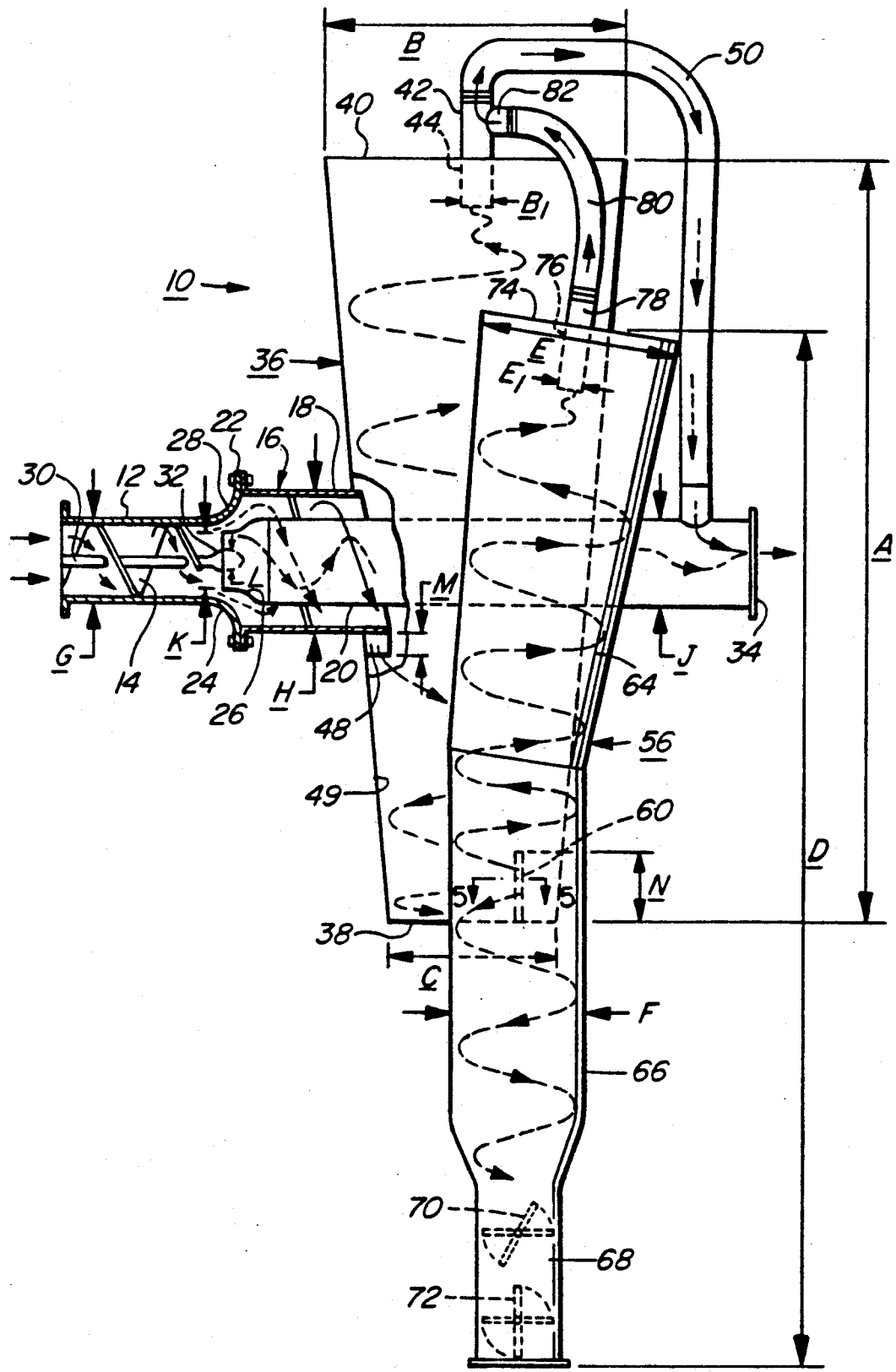
FIG. 1 is a side elevation view, partly in section, of separating apparatus in accordance with an embodiment of the invention.
Figure 2:
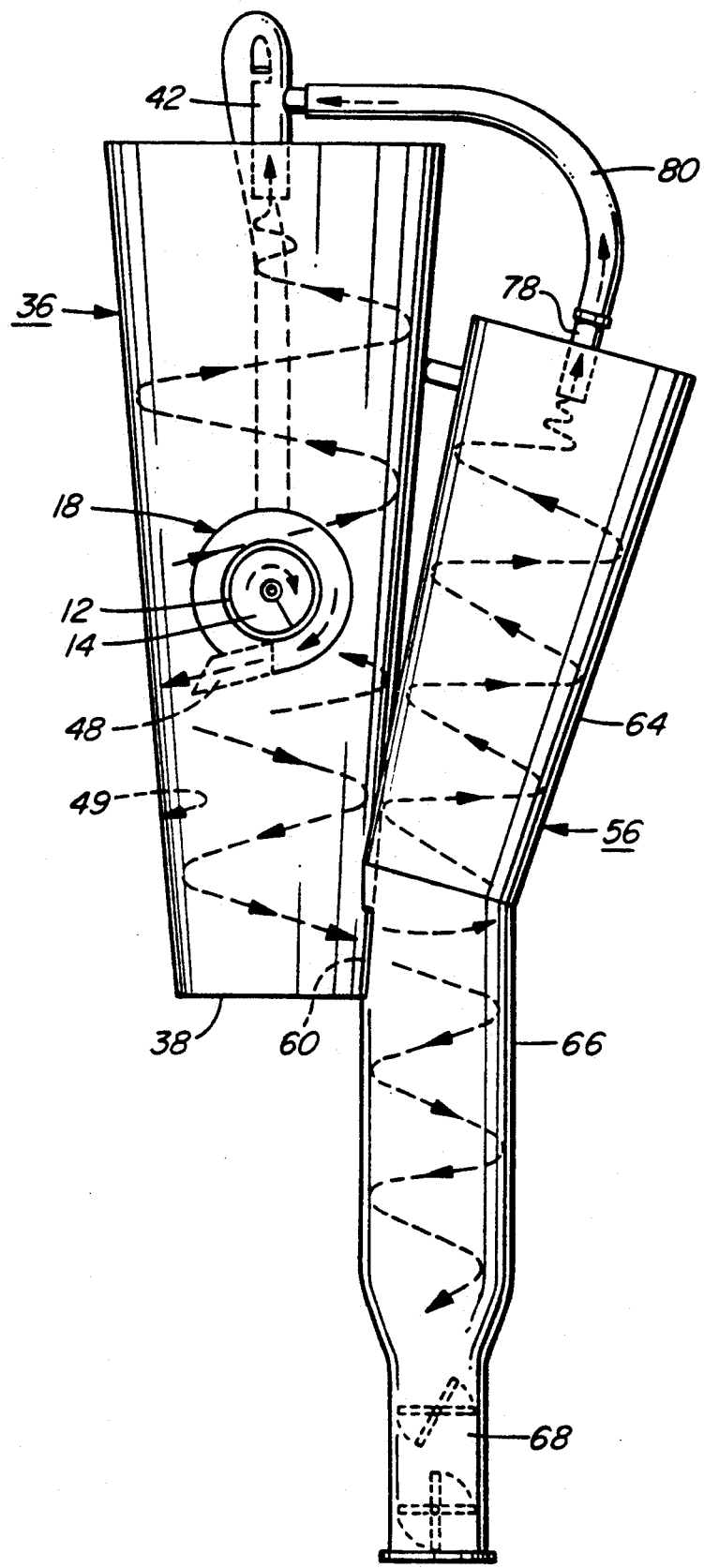
FIG. 2 is a further side elevation view thereof rotated 90° from that of FIG. 1 and looking toward the air inlet tube.
Figure 3:
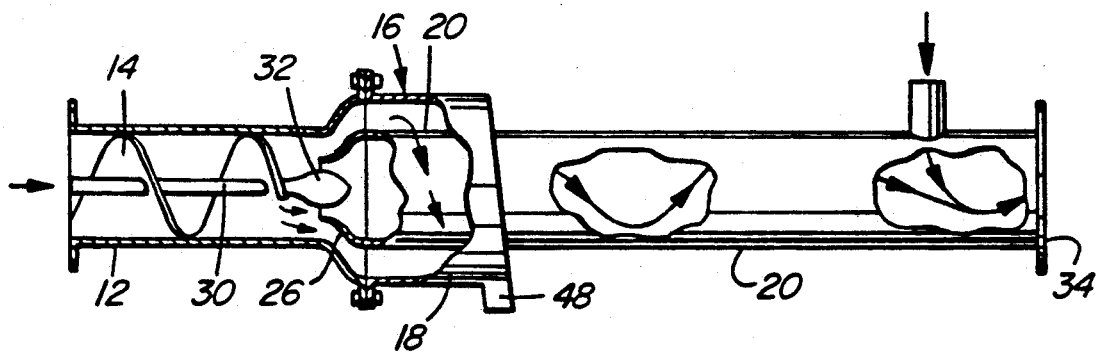
FIG. 3 is a side elevation view, partially cut away to show the interior, of the inlet tube, the separation chamber and the extraction tube.

Referring now to the drawings there is shown an apparatus 10 for separating dust particles and the like from a gaseous medium such as air. The apparatus includes a cylindrical inlet tube 12 which is adapted to receive an axially moving flow of particle-laden gas. An axially arranged flow rotation device in the form of a screw or auger-like device 14 serves to effect rapid spinning motion or rotation of the gas around the axis of the inlet tube 12. This spinning motion sets up strong centrifugal forces within the inlet tube 12 causing particles to be moved by centrifugal force radially outwardly toward the inside wall of inlet tube 12.

A separation chamber 16 is arranged concentrically with the inlet tube 12 and downstream of the flow rotation device 14. The separation chamber defines an annular region bounded by the outer cylindrical wall 18 of the separation chamber and an inner cylindrical extraction tube 20. The outer wall 18 of the separation chamber is connected to the inlet tube 12 by way of an annular bolted flange arrangement 22 which permits the inlet tube 12 and its associated flow rotation device 14 to be removed or separated from the separation chamber 18 thereby to allow for access to the interior components. The downstream end of inlet tube 12 is provided with an outwardly flared transition section 24 which reduces unwanted turbulence in the flow.

The inner extraction tube 20 includes an annular leading edge portion 26 with the free cutting edge thereof being axially located at the entrance to the above-noted transition section 24 with an annular passageway 28 being provided between the transition section 24 and the leading edge portion 26. The leading edge portion 26 is itself gradually reduced in diameter toward its leading upstream free cutting edge thereby to provide for a smooth transition between itself and the full diameter portion of the inner extraction tube 20. The leading edge portion 26 may be mounted by screw threads or other suitable means onto the upstream end of the extraction tube 20 thereby to allow for its replacement in the event of wear and/or to provide for slightly differing leading edge diameters depending upon the materials being handled.

It will be noted that the flights of the flow rotation device 14 terminate a distance upstream of the leading edge portion 26 thereby to allow for a reduction in turbulence before the free cutting edge of the leading edge portion 26 is reached.

The flow rotation device 14 also carries an axially arranged shaft 30 carrying on its downstream end a smoothly contoured bulb-shaped air deflector 32, the maximum diameter of which is just slightly downstream of the free cutting edge of the leading edge portion 26. The bulb-shaped air deflector 32 serves to maximize the flow velocity at the entrance to the leading edge portion 26.

It can be readily seen that the leading edge portion 26 at the upstream end of extraction tube 20 will serve to split the rapidly rotating gaseous flow into a rotating radially outer particle-rich stream and a radially inner particle-poor stream of gas. The inner particle-poor stream of gas moves axially within the extraction tube 20 to the exit end 34 of same. At the same time the rotating particle-rich stream spirals along within the annular region defined by the separation chamber 16 between the outer wall 18 and the wall of the extraction tube 20.

An elongated generally vertically oriented first deceleration chamber 36 is connected to the exit end of separation chamber 16 to receive therefrom the particle-rich stream of gas which moves along the annular chamber noted above. The first deceleration chamber 36 is of a frustro-conical shape as shown, having a relatively smaller diameter flat bottom 38 and a relatively large diameter top 40, in the center of which there is provided an outlet 42 for particle-poor gases, the outlet 42 including a vortex finder 44 which extends interiorly of the chamber 36 a short distance along the longitudinal axis thereof.

It will be noted that the extraction tube 20 extends completely through the first deceleration chamber 36 with the longitudinal axis of the extraction tube 20 intersecting the longitudinal symmetry axis of the chamber 36 at right angles. Since the extraction tube 20 is of much smaller diameter than the diameter of the first deceleration chamber 36 at that point, there is plenty of room for gases to move upwardly in the first deceleration chamber 36 around the extraction tube 20.

The particle-rich or concentrated stream of gas that was split off by the action of the leading edge portion 26, as noted previously, spirals along the annular region of the separation chamber 16 with provision being made for this spiralling flow to pass into the first deceleration chamber by way of an entry port 48 which is in a tangential relation to the outlet end of the separation chamber 18 and which is also arranged to discharge in close juxtaposition to the inner conical sidewall 49 of the first deceleration chamber 36. It will be seen that the entry port 48 is downwardly sloped to induce downward spiralling motion of the particle-rich fraction adjacent to and around the sidewall 49 of the first deceleration chamber. At the same time as the particle-rich fraction of the dust entering the first deceleration chamber 36 spirals downwardly toward the bottom thereof, under the influence of gravity, a relatively particle-poor fraction of the gas entering the chamber spirals upwardly, (in the process losing velocity and losing even more particles therefrom as the result of the action of gravity), with such particle-poor fraction of the gas ultimately reaching the above-noted vortex finder 44 and departing the first deceleration chamber. This particle-poor fraction of the gas then travels by way of a conduit 50 upwardly around and thence downwardly with the conduit 50 being joined to the previously described extraction tube 20 adjacent the exit end 34 of same so that the two flows of particle-poor gas are joined with one another and depart the apparatus.

It will be noted that the entry port 48 is located at a point spaced from the bottom 38 of the first decelerator chamber by a distance equal to about one-third of the total height of the first decelerator chamber 36. This has been found to produce good results in terms of dust or particle separation. This particular arrangement of the entry port 48 arranged in close juxtaposition to the interior wall 49 of the decelerator chamber 36 is made possible by virtue of the structural arrangement shown wherein the extraction tube 20 passes through the longitudinal center line of the first decelerator chamber 36 as described above. The purpose of concentrating the particulate material or dust at the inside surface of the conical decelerator chamber 36 is to maintain the dust concentration at the inside surface as opposed to having, the dust dispersed within the decelerator chamber. By positioning the entry port 48 immediately adjacent the inside surface 49 of the decelerator chamber 36 with the downward slope as shown, the particle-rich gases have sufficient velocity so as to propel the particles into the second decelerator chamber 56, which chamber will be described hereafter.

As was noted above, because of the downwardly sloping channel or conduit-like entry port 48 from the separator chamber 16 into the first decelerator chamber 36, the concentrated particulate matter or dust is not allowed to become diluted with the air again within such chamber. Rather, the concentrated particle-rich dust is deflected by the entry port 48 toward the interior wall 49 of the decelerator chamber 36 at an angle some 20° downwardly from the horizontal thus causing this particle-rich flow to travel in a spiral path downwardly along the interior wall 49 until it reaches a tangentially arranged exit opening 60 immediately above the bottom 38 of the decelerator chamber 36. This exit opening 60 is arranged to continuously strip or peel off the concentrated particle-rich fraction of the gas which has spiralled downwardly toward the bottom 38. This peeled-off particle-rich fraction then enters the second decelerator chamber 56 at the lower mid-point thereof in a manner to be more fully described.

The second decelerator chamber 56 has an upper frustro-conically shaped portion 64 and a lower elongated generally cylindrical vertically oriented portion 66. The lower cylindrical portion 66 leads into a particle collection chamber 68 provided with upper and lower air-tight valves 70 and 72 thereby to permit the particles to be collected and dumped from the apparatus without interference with the operation thereof. The upper larger diameter end 74 of the second decelerator chamber 56 is provided with a short inwardly extending vortex finder 76 which communicates with the outlet 78 which, in turn, is connected to a conduit 80 which leads upwardly and is connected via a suitable tee 82 to the top outlet 42 of the first decelerator chamber 36. Hence, the upwardly spiralling particle-poor fraction of the gas reaching the upper end of the second decelerator chamber 56 exits via the vortex finder 76, outlet 78, conduit 80 and thence travels via the tee connection 82 into the particle-poor stream of gas leaving the upper end of the first decelerator chamber 36. These two flows, thus effectively combined, join the particle-poor gas flow passing along the interior of the extraction tube 20 and the combined flows thus all pass through the exit end portion 34 of extraction tube 20.

Owing to the very close juxtaposition of the lower cylindrical portion 66 of the second decelerator chamber 56 with the lower conical wall portion of the first decelerator chamber 36, the upper conical portion 64 of decelerator chamber 56 is inclined relative to the cylindrical portion 66 by a small angle in order to avoid interference between the conical wall of chamber 36 and conical chamber portion 64.

Figure 4:
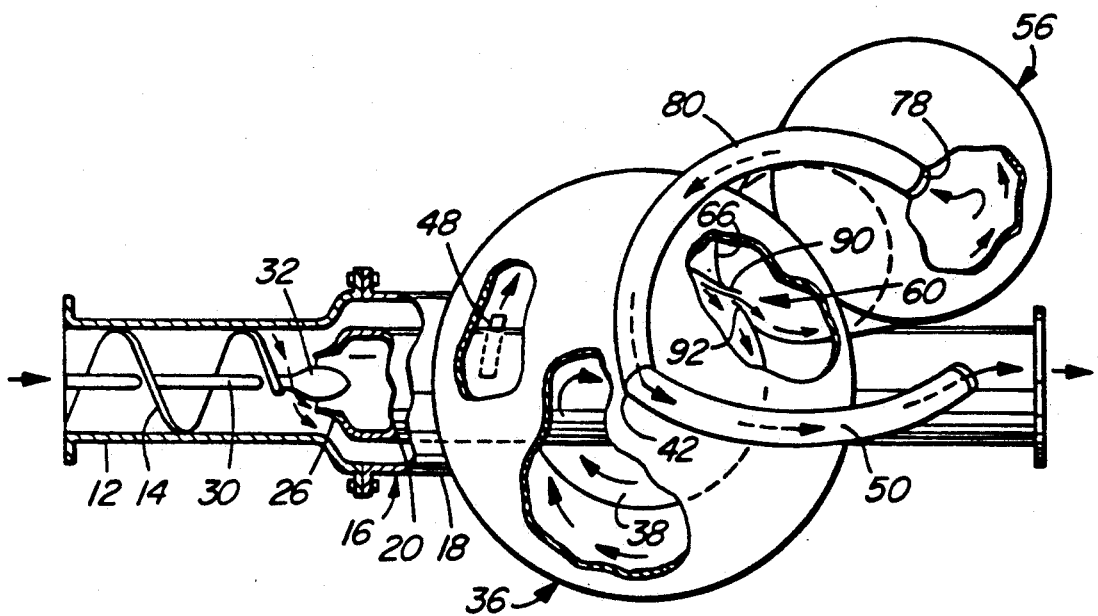
FIG. 4 is a plan view of the separating apparatus, partially cut away in various places to show the interior structure.
Figure 5:
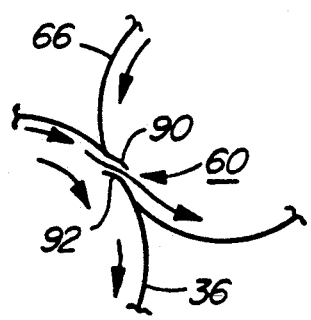
FIG. 5 is a section view along line 5—5 of FIG. 1 showing the tangential exit port.

The slot-like nature of the tangential exit opening 60 from the lower end of decelerator chamber 36 into the upper part of cylindrical portion 66 is readily seen with reference to FIGS. 4 and 5. The walls of chambers 36 and 66 are shown in the cut-away portion of FIG. 4 and the section of FIG. 5 at the mid-height region of tangential slot-like exit opening 60. It will be seen that the conical wall of chamber 36 immediately adjacent the slot-like opening 60 is provided with a radially outwardly directed deflector 90 forming one side of the slot, with the other vertical side of the slot being slightly deflected radially inwardly of chamber 36 as shown at 92. This radially inwardly directed side portion 92 of the slot serves to peel-off the particle-rich fraction of gas that is rotating adjacent the bottom 38 of the decelerator chamber 36. At the same time, the oppositely disposed radially outwardly directed deflector 90 serves to cause this peeled-off particle-rich fraction of gas to hug the interior wall of the cylindrical portion 66 of the second decelerator chamber 56. As can readily be seen, this particle-rich fraction of gas effectively changes its direction of rotation on entry into this cylindrical portion 66. This action serves to maintain and enhance the concentration of particles as the particles spiral in a downward motion within the cylindrical portion 66 closely adjacent the interior wall of same. The air that has entered the second deceleration chamber 56 by way of the exit opening 60 spirals in an upward direction, gradually losing velocity in the conical upper portion 64 of the chamber 56 as noted previously and thereafter exiting the chamber 56 via the vortex finder 76, at which point, in common with the gas or air leaving the vortex finder 44 and passing through extraction tube 20, it contains a very low concentration of particulate matter.

The particulate material which has spiralled downwardly within the cylindrical portion 66 enters the collection region 68. As previously noted, collection chamber 68 includes a pair of air-tight rotatable valves 70 and 72 of a design well known per se in the art. Two such air tight valves are required thereby to maintain an air seal at all times to avoid disrupting the operation of the separator. In operation, it will be assumed that valves 70 and 72 are both closed. After a sufficient level of particles builds up above valve 70, valve 70 is opened thus dumping the particles down into the collection chamber in the region between valves 70 and 72. Valve 70 is thereafter tightly closed and valve 72 is opened thereby to dump the particles into a suitable collector bin or silo (not shown). Valve 72 is then closed and the cycle described above is repeated.

It should also be noted here that a plurality of identical separators 10 may be attached together in series with the exit opening 34 connected to the entrance end of the inlet tube 12 of the next succeeding unit. Two or three of such units should ensure near-total particle or dust removal from air or other gases under ordinary circumstances.

The particle separator as described can be utilized with either a suction pump or a pressure pump. In a suction system, the intake end of a pump is connected to the exit outlet 34 of the extraction tube 20 whereas in a blow or pressure system, the outlet pressure end of a pump is connected to the entrance end of inlet tube 12. The efficiency of a single separator unit is somewhat higher when used with a pressurized flow of air but this difference in efficiency between suction and pressure systems is minimized when several separators are arranged in series as briefly described above.

For the further assistance of those skilled in the art, dimensions for a typical unit have been provided, reference being had to the table of dimensions given below and the reference characters and dimension lines given in FIG. 1. It should be realized that these are illustrative dimensions only and not limiting on the scope of the invention.

TABLE OF DIMENSIONS

| | | |
|---|---|---|
| A. | First decelerator chamber height | 45 ins. |
| B. | First decelerator chamber top diameter | 18 ins. |
| B1. | First decelerator chamber vortex finder diameter | 2.5 ins. |
| C. | First decelerator chamber bottom diameter | 8 ins. |
| D. | Second decelerator chamber height (including collection chamber) | 58 ins. |
| E. | Second decelerator chamber top diameter | 12 ins. |
| E1. | Second decelerator chamber vortex finder diameter | 2.5 ins. |
| F. | Second decelerator chamber bottom (cyl.) diameter | 8 ins. |
| G. | Inlet tube diameter | 5 ins. |
| H. | Separation chamber outer diameter | 8 ins. |
| J. | Separation chamber inner diameter | 5 ins. |
| K. | Extraction tube leading edge diameter | 4.375 ins. |
| L. | Bulb deflector maximum diameter | 1.75 ins. |
| M. | Entry port (height × width) | 1.5 × 1.5 ins. |
| N. | Exit slot (height × width) | 4 × 0.375 ins. |
| | Volume throughput range | 600–1000 C.F.M. |
| | Particle size range approx. | 4 microns to 3/16 inch |
| | Separation efficiency range approx. separator unit | 70–90% per |

Materials tested to date (July '92) (Manganese oxide powder, cement dust, pulverized lime dust)

A preferred embodiment of the invention has been described and illustrated by way of example. Those skilled in the art will realize that various changes and modifications may be made while still remaining within the spirit and scope of the invention. For definitions of the invention, reference is to be had to the appended claims.

We claim:

1. Apparatus for separating particles from a gaseous medium comprising:

an inlet tube adapted to receive an axially moving flow of particle-laden gas;

an axially arranged flow rotation device disposed in said inlet tube to effect rotation of the gas around the axis of the inlet tube whereby particles are moved by centrifugal force radially outwardly to the wall of the inlet tube;

a separation chamber arranged concentrically with said inlet tube and downstream of said flow rotation device, said separation chamber defining an annular region bounded by an outer tubular wall and an inner extraction tube having a free upstream leading edge which splits the rotating flow into a rotating radially outer particle-rich stream and a radially inner particle-poor stream of gas, the particle-poor stream of gas moving axially within said extraction tube to an exit end thereof and the rotating particle-rich stream spiralling along said annular region of said separation chamber between said outer tubular wall and said inner extraction tube;

an elongated first deceleration chamber connected to said separation chamber to receive therefrom the particle-rich stream of gas, said first deceleration chamber defining a generally upright longitudinal central axis and having upper and lower outlets with said first deceleration chamber being shaped such that the particle-rich gas received therein spirals around the central axis thereof with a particle-poor fraction thereof spiralling upwardly toward and escaping through the upper outlet and a particle-rich fraction thereof spiralling downwardly under the influence of gravity and exiting via said lower outlet.

2. Apparatus according to claim 1 wherein the first deceleration chamber receives the particle-rich stream of gas from the separation chamber via an entry port arranged closely adjacent the side wall of the first deceleration chamber to induce downward spiralling motion of the particle-rich fraction adjacent to and around the wall of the first deceleration chamber.

3. Apparatus according to claim 2 wherein the upper outlet of the first deceleration chamber includes an axially arranged vortex finder through which the rotating particle-poor fraction of the gas escapes said chamber while said lower outlet comprises a tangentially arranged exit opening for continuously stripping or peeling off the particle-rich fraction of the gas which has spiralled to the lower end of the first deceleration chamber.

4. Apparatus according to claim 3 further including a second deceleration chamber arranged to receive the particle-rich fraction of the gas via said lower outlet, said second deceleration chamber being a generally vertically oriented elongated chamber having a bottom end adapted to receive and collect particles and an upper end to receive and permit escape of particle-poor gases.

5. Apparatus according to claim 4 wherein said second deceleration chamber is juxtaposed to the first deceleration chamber at said tangentially arranged exit opening so that the peeled-off particle-rich fraction of gas smoothly changes rotation direction on entering the second decelerating chamber and continues rotating and spiralling closely adjacent interior wall portions thereof to maintain and enhance the degree of particle concentration while moving toward the lower particle collecting bottom end while a particle-poor fraction of the gas spirals toward the upper end of the chamber, said second decelerating chamber having an axially arranged vortex finder to provide escape of the spiralling gases.

6. The apparatus according to claim 5 wherein both of said decelerating chambers include a conically shaped wall which increases in diameter toward the top.

7. Apparatus according to claim 4 including conduit means transmitting the particle-poor gas flows from the upper outlets of the first and second deceleration chambers toward and into the particle-poor stream of gas travelling axially along said extraction tube.

8. Apparatus according to claim 6 including conduit means transmitting the particle-poor gas flows from the upper outlets of the first and second deceleration chambers toward and into the particle-poor stream of gas travelling axially along said extraction tube.

9. Apparatus according to claim 3 wherein said extraction tube extends through said first deceleration chamber normal to said longitudinal central axis of said chamber, said extraction tube having an exit end on one side of the first deceleration chamber diametrically opposite the side thereof at which said separation chamber is located and wherein said first deceleration chamber has a diameter measured normal to said central axis which is much greater than the diameter of said extraction tube at the location of said extraction tube.

10. Apparatus according to claim 8 wherein said extraction tube extends through said first deceleration chamber normal to said longitudinal central axis of said chamber, said extraction tube having an exit end on one side of the first deceleration chamber diametrically opposite the side thereof at which said separation chamber is located and wherein said first deceleration chamber has a diameter measured normal to said central axis which is much greater than the diameter of said extraction tube at the location of said extraction tube.

11. Apparatus according to claim 1 including an axially disposed bulb-shaped flow deflector located to maximize flow velocity adjacent said upstream leading edge of the extraction tube.

12. Apparatus according to claim 5 including an axially disposed bulb-shaped flow deflector located to maximize flow velocity adjacent said upstream leading edge of the extraction tube.

13. A method for separating particles from a gaseous medium comprising the steps of:
 introducing an axially moving flow of particle-laden gas into an inlet tube;
 effecting rotation of the particle-laden gas around the axis of the inlet tube whereby particles are moved by centrifugal force radially outwardly to the wall of the inlet tube;
 advancing the rotating particle-laden gas toward a separation chamber arranged concentrically with said inlet tube, said separation chamber defining an annular region bounded by an outer tubular wall and an inner extraction tube having a free upstream leading edge which splits the rotating flow into a rotating radially outer particle-rich stream and a radially inner particle-poor stream of gas, the particle-poor stream of gas moving axially within said extraction tube to an exit end thereof and the rotating particle-rich stream spiralling along said annular region of said separation chamber between said outer tubular wall and said inner extraction tube;
 passing the particle-rich stream of gas from said separation chamber into an elongated first deceleration chamber, said first deceleration chamber defining a generally upright longitudinal central axis and having upper and lower outlets with said first deceleration chamber being shaped such that the particle-rich gas received therein spirals around the central axis thereof with a particle-poor fraction thereof spiralling upwardly toward and escaping through the upper outlet and a particle-rich fraction thereof spiralling downwardly under the influence of gravity and exiting via said lower outlet.

14. A method according to claim 13 wherein the particle-rich stream of gas from said separation chamber passes into said first deceleration chamber via an entry port arranged closely adjacent the side wall of the first deceleration chamber to induce downward spiralling motion of the particle-rich fraction adjacent to and around the wall of the first deceleration chamber.

15. A method according to claim 14 wherein the rotating particle-poor fraction of the gas escapes said first deceleration chamber via an axially arranged vortex finder while continuously stripping or peeling off the particle-rich fraction of the gas which has spiralled to the lower end of the first deceleration chamber via a tangentially arranged lower exit opening.

16. A method according to claim 15 further including providing a second deceleration chamber arranged to receive the particle-rich fraction of the gas via said tangentially arranged lower exit opening, said second deceleration chamber being a generally vertically oriented elongated chamber having a bottom end adapted to receive and collect particles and an upper end to receive and permit escape of particle-poor gases.

17. A method according to claim 16 wherein said second deceleration chamber is juxtaposed to the first deceleration chamber at said tangentially arranged exit opening with the peeled-off particle-rich fraction of gas smoothly changing rotation direction on entering the second decelerating chamber and continuing rotating and spiralling closely adjacent interior wall portions thereof to maintain and enhance the degree of particle concentration while moving toward the lower particle collecting bottom end while a particle-poor fraction of the gas spirals toward the upper end of the second decelerating chamber and escapes therefrom via an axially arranged vortex finder.

18. A method according to claim 17 including transmitting the particle-poor gas flows from the upper outlets of the first and second deceleration chambers toward and into the particle-poor stream of gas travelling axially along said extraction tube.

* * * * *